Figure 1:
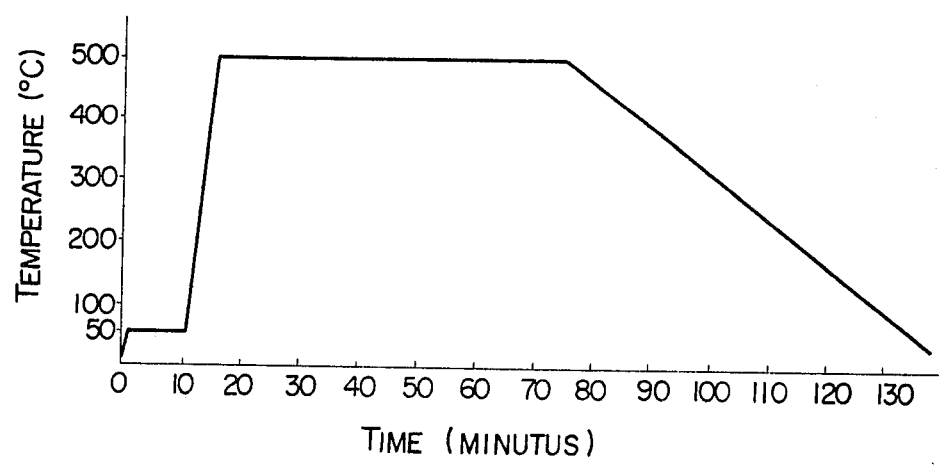

United States Patent [19]

Kinugawa et al.

[11] 4,252,841
[45] Feb. 24, 1981

[54] PROCESS FOR PRODUCING TRANSPARENT CONDUCTIVE FILM

[75] Inventors: Kiyoshige Kinugawa; Shizuo Ishitani; Yosio Hanada, all of Mobara; Satoru Ogihara, Hitachi; Tadashi Ishibashi, Mobara, all of Japan

[73] Assignee: Hitachi, Ltd., Japan

[21] Appl. No.: 21,179

[22] Filed: Mar. 16, 1979

[30] Foreign Application Priority Data

May 19, 1978 [JP] Japan .................................. 53-58929

[51] Int. Cl.³ ...................... C03C 17/23; C03C 17/27; B05D 5/12
[52] U.S. Cl. .................................. 427/108; 427/126.2; 427/126.3; 427/164; 427/165; 427/169; 427/380; 427/419.3; 427/419.8; 427/226
[58] Field of Search ............... 427/108, 126, 380, 164, 427/165, 169, 226, 419.3, 419.8

[56] References Cited

U.S. PATENT DOCUMENTS 3,847,659  11/1974  Sobajima et al. ..................... 427/108

FOREIGN PATENT DOCUMENTS 52-1497   1/1977  Japan .
52-37763  3/1977  Japan .
1416072  12/1975 United Kingdom ..................... 427/108

*Primary Examiner*—John D. Smith
*Attorney, Agent, or Firm*—Craig & Antonelli

[57] ABSTRACT

Transparent conductive films produced by a series of steps comprising a coating step in which a solution obtained by dissolving an indium compound and a tin compound in an organic solvent is coated on a substrate; a preliminary drying step in which the coated substrate is dried at a temperature of 35° to 100° C.; a temperature rise step in which the coated substrate is heated at a temperature rise rate of 20° C./min or more up to 400° C. or higher; and a calcination step in which the coated substrate is calcined at a temperature of 400° C. or higher, or by repeating said series of steps two or more times, have excellent properties such as strong adhesive strength to a substrate, excellent transmittance and remarkably low sheet resistance.

12 Claims, 2 Drawing Figures

PROCESS FOR PRODUCING TRANSPARENT CONDUCTIVE FILM

This invention relates to a process for producing transparent conductive films on glass substrates and the like.

Transparent conductive films are widely used as transparent electrodes for liquid crystal display elements, electroluminescences, etc., as antistatic films and electric masking films for various parts and apparatuses, antifreezing heaters for windows of cars, and the like.

As the transparent conductive films, there have been known films of tin oxide or indium oxide. Tin oxide films are formed by the vapor phase growing method and the like and good in productivity, but since it is very difficult to etch the tin oxide films or it is very difficult to form transparent electrodes having minute patterns by using them, they are unsuitable for applying to liquid crystal display elements having complicated electrode patterns, and the like. On the other hand, indium oxide films can easily be etched, but since they are formed batchwise by vacuum evaporation with electric resistance heating or electron beam heating of indium oxide in vacuum, there is a problem in productivity. That is, operating time of one batch requires 60 to 120 minutes, which results in lowering in operating efficiency. This problem may be solved by installing more vacuum pumps, but plant investment will increase uneconomically. In addition, it is difficult to form a uniform thin film on a substrate having dimensions more than 100×100 mm, and thus the use of the indium oxide film is limited from the dimensions of substrates to be coated.

In order to solve such a problem, there has been proposed a method for forming an indium oxide film by coating on a substrate a solution of compounds containing indium as a main component and calcining it. But according to this coating method, adhesion of the indium oxide film to the substrate was generally poor and the film strength was also not good. Thus, the indium oxide film formed on a substrate was able to be easily peeled off during the etching treatment for making the prescribed pattern after forming the indium oxide film or during the resist removing procedure for removing a resist film coated for conducting etching, and disconnection of electrode patterns often took place due to damage during the operation. Therefore the coating method was not suitable for producing transparent conductive films having minute patterns used, for example, in liquid crystal display elements and the like. Further, the indium oxide film produced by the coating method had high sheet resistance and caused so-called whitening phenomenon, wherein the surface of the film became white, so that it was difficult to obtain transparent conductive films which can be used in liquid crystal display elements and the like. For example, Japanese patent application Kokai (Laid-Open) Nos. 1497/77 and 37763/77 disclose methods for forming transparent conductive films by the coating method, but there are problems in adhesion properties, strength of the films, and whitening phenomenon.

It is an object of this invention to provide a process for producing a transparent conductive film having excellent transmitting property and low sheet resistance solving the problems of the known methods with excellent productivity.

This invention provides a process for producing a transparent conductive film which comprises a coating step in which a solution obtained by dissolving an indium compound and a tin compound in an organic solvent is coated on a substrate, a preliminary drying step in which the coated substrate is dried at a temperature of 35°–100° C., a temperature rise step in which the coated substrate is heated at a temperature rise rate of 20° C./min or more up to 400° C. or higher, and a calcination step in which the coated substrate is calcined at a temperature of 400° C. or higher.

In the process of this invention, the above-mentioned individual steps can be repeated two times or more to form multilayered film construction.

Figure 2:
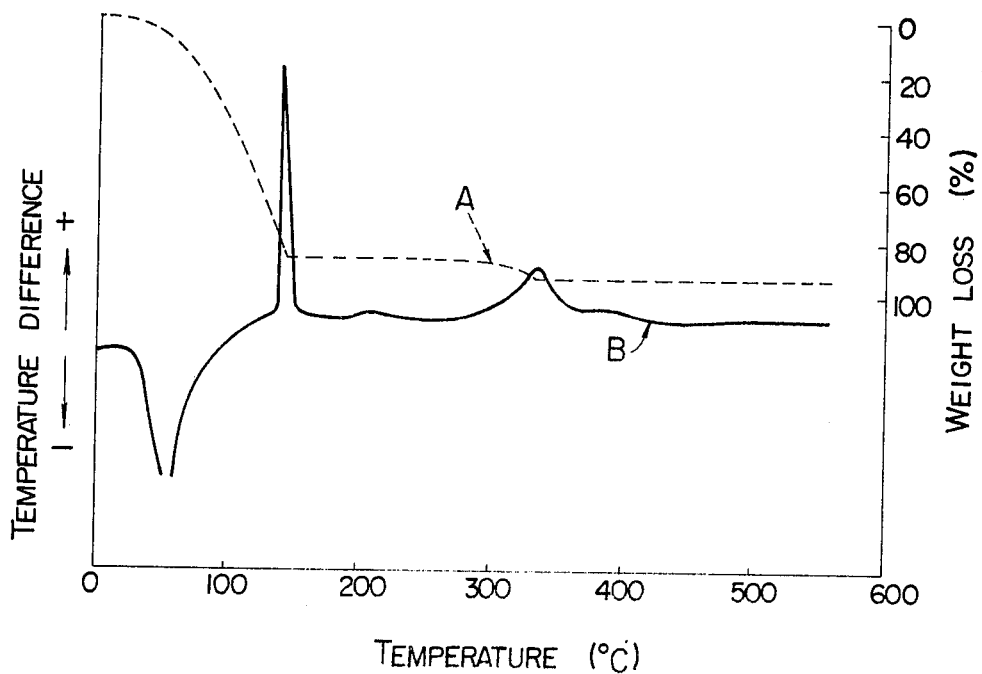

In the attached drawings, FIG. 1 is a graph showing a temperature schedule in individual steps of the process of this invention and FIG. 2 is a graph showing the results of differential thermal and thermobalance analyses of a solution obtained by dissolving an indium compound and a tin compound in an organic solvent.

This invention is explained in detail by way of a working example.

EXAMPLE

Indium nitrate is dissolved in acetylacetone to give a solution A. To a mixed solution of acetylacetone and nitric acid, tin is added and the reaction between tin and nitric acid is carried out in the presence of acetylacetone to give a solution B dissolving tin. The solution A is mixed with the solution B to give a solute. The mixing ratio of the solution A to the solution B is determined so that the amount of tin oxide ($SnO_2$) becomes 6% by weight based on the total amounts of indium oxide ($In_2O_3$) and tin oxide when the solute is decomposed to indium oxide and tin oxide. To the solute, an organic solvent containing at least one of methanol, ethanol or acetone is added for diluting the solute to give a coating solution. The amount of the solvent is adjusted so that a residual solid content becomes 6% by weight after vaporizing the solvent of the coating solution.

Subsequently, a glass substrate made of Pyrex previously washed and cleaned sufficiently is dipped in the coating solution placed in a tank maintained at about room temperature. Then the glass substrate coated with the coating solution is drawn up at a constant rate. When the glass substrate is drawn up at a rate of 45 cm/min, a transparent conductive film of about 500 Å thick can be obtained after calcination as mentioned hereinafter. Thickness of the transparent conductive film may take an optional value depending on the residual solid content of the coating solution, the drawing up rate, and the like.

After the above-mentioned coating step, the glass substrate is immediately placed in a drying oven maintained at a temperature of 55° C. A preliminary drying step is conducted in the drying oven for about 10 minutes.

Subsequently, the glass substrate is taken out of the drying oven and rapidly put in a calcining furnace previously controlled at 500° C.±10° C. and filled with a non-oxidizable inert gas by using a pusher. The temperature rise rate of the glass substrate in the furnace measured by using a thermocouple is about 100° C./min. The glass substrate is moved through the calcining furnace by a conveyer for about 1 hour to finish the calcination step. The temperature of the glass substrate is gradually lowered with the movement of the conveyer and returned to room temperature after being taken out of the calcining furnace.

FIG. 1 is a graph showing a temperature schedule in individual steps of this invention. In industrial production of transparent conductive films, the preliminary drying step, the temperature rise step and the calcination step can be conducted continuously based on a temperature schedule as shown in FIG. 1.

The thus produced transparent conductive film formed on the glass substrate has a thickness of 500 Å ±50 Å, and sheet resistance of as low as 1.5 kΩ/square ±0.5 kΩ/square. Further, no whitening phenomenon takes place and no damage is observed after rubbing more than 100 times according to the rubbing test defined in MIL STD (Military Standard, C-6-75A, items 4, 6 and 11).

In the next place, the glass substrate returned to room temperature after being taken out of the calcining furnace mentioned above is subjected to the above-mentioned coating step, the preliminary drying step, and the calcination step again in the same manner in order to form a second layer of transparent conductive film. The resulting film has a thickness of 1000 A ±80 A and sheet resistance of 0.6 kΩ/square±0.1 kΩ/square.

If desired, multilayered film construction can be obtained by repeating the above-mentioned steps several times in the same manner. When the multilayered film construction is employed, defects of the transparent conductive film such as pinholes can be reduced in comparison with the one-layer film construction. Further in order to lessen sheet resistance remarkably, it is necessary to thicken the thickness of the film. If the thickness of the film is thickened in a one-layer film, whitening phenomenon easily takes place, but if the thickness of the film is thickened in a multilayered film, no whitening phenomenon takes place and the resulting film is excellent in transmittance and has remarkably lowered sheet resistance.

In the above-mentioned Example, explanation is made on the case of using indium nitrate, tin, a β-diketone such as acetylacetone and nitric acid as solute in the solution for producing transparent conductive films on a glass substrate. More generally, indium, tin, a β-diketone and nitric acid can be used as the solute. The use of such a combination is explained below. When hydrochloric acid is used in place of nitric acid, since a chloride is hardly decomposed, chlorine ions are easily retained in the resulting transparent conductive film, which results in lowering in alkali resistance and in strength of the film itself. On the contrary, when nitric acid is used, since a nitrate is easily decomposed by heating in general and has stronger oxidative effect, there are many advantages in that oxides of indium and tin can easily be formed, oxidative decomposition of organic molecules can easily take place, and the like. When acetylacetone is used as a β-diketone, the solute seems to be composed of the compounds having the following structural formulae, which function effectively for producing a coating film:

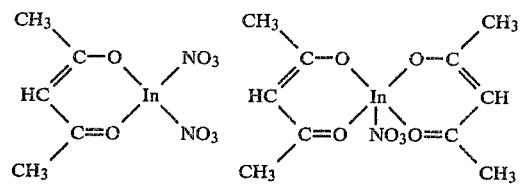

(I)                                (II)

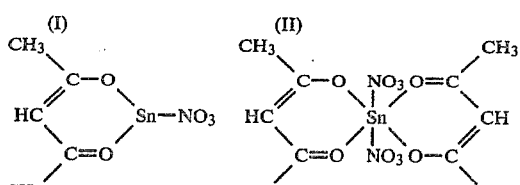

(III)                              (IV)

After the calcination, tin oxide is properly mixed with indium oxide to remarkably improve properties such as sheet resistance and adhesion strength. In the case of forming the solute of the coating solution, when tin is reacted with nitric acid in the presence of a β-diketone, dissolution of tin can effectively be conducted. That is, if tin is directly dissolved in a nitric acid solution, produced tin nitrates ($Sn(NO_3)_2$ and $Sn(NO_3)_4$) are immediately reacted with water to give precipitates such as stannous hydroxide ($Sn(OH)_2$) and stannic hydroxide ($Sn(OH)_4$), which results in insufficient dissolution of tin. On the other hand, in the case of using acetylacetone as a β-diketone, acetylacetone is present as shown in the following structural formula:

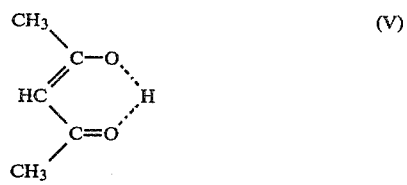

(V)

In such a state, the hydrogen atom is unstable and easily separated and can be replaced by other ion. When tin is reacted with nitric acid in the presence of acetylacetone, produced tin nitrate liberates tin ions and nitrate ions, so that tin ion takes the position of the hydrogen atom in the structural formula (V) of acetylacetone to give such compounds as shown in the structural formulae (III) and (IV). Thus tin seems to be almost completely dissolved in the solution.

In the case of using indium, tin, acetylacetone and nitric acid, indium can be added to the solution at any order but each component has a preferable range as to its amount. It is preferable to use 1 part by weight of indium, 1.3 to 9.0 parts by weight of acetylacetone and 1.0 to 6.0 parts by weight of nitric acid. If the amount of acetylacetone is less than 1.3 parts by weight or the amount of nitric acid is less than 1.0 part by weight per part by weight of indium, indium or tin cannot be dissolved sufficiently, which results in giving an unfavorable coating solution. On the other hand, if the amount of acetylacetone is more than 9.0 parts by weight or the amount of nitric acid is more than 6.0 parts by weight per part by weight of indium, no uniform transparent conductive film can be obtained after calcination due to the generation of a large number of pinholes. Weight ratio of tin/indium is preferably in the range of 0.01/1 to 0.30/1 to give sheet resistance of less than 10 kΩ/square.

In the process of this invention, features are present in the preliminary drying step and the temperature rise step. When a substrate coated with the coating solution was put in the calcination step preheated at 500° C. directly after the coating step without via the preliminary drying step, the resulting conductive film was subjected to whitening phenomenon and lost its transmittance remarkably, that is, lost its function as a transparent conductive film. When the coated substrate is subjected to the preliminary drying step, it can be allowed to stand for several tens hours without changing its properties, so that to have the preliminary drying step is very advantageous from the viewpoint of processability. The temperature of the preliminary drying step is 35° to 100° C., preferably 45° to 70° C., in order to vaporize the organic solvent.

In the temperature rise step, the greater the temperature rise rate becomes, the harder the transparent conductive film becomes. At the same time, sheet resistance of the transparent conductive film becomes lower. When the temperature rise rate is about 5° C./min, whitening phenomenon takes place and the resulting conductive film has sheet resistance of about 7 kΩ/square and suffers damage after 10 times of rubbing in the rubbing test. When the temperature rise rate is about 15° C./min, whitening phenomenon also takes place but sheet resistance is lowered to about 5 kΩ/square. When the temperature rise rate is about 20° C./min, no whitening phenomenon takes place and sheet resistance is lowered to a preferable value of about 1.5 kΩ/square. As to the surface hardness of the conductive film, the temperature rise rate of less than 20° C./min only gives insufficient hardness and easily scratchable surface, but the surface hardness of the film increases remarkably when the temperature rise rate becomes 20° C./min or more. A preferable range of the temperature rise rate is 100° C./min or more.

The temperature of the calcination step is 400° C. or higher, and the most preferable one is about 500° C. Too high calcination temperature is not preferable because of the deformation of a glass substrate to be treated. For example, in the case of soda-lime glass, upper limit of the calcination temperature is about 530° C. due to its deformation. Organic compounds are generally decomposed over 400° C., so that unnecessary organic compounds disappear during the calcination.

The attached FIG. 2 is a graph showing the results of differential thermal and thermobalance analyses of the solution used in the above-mentioned Example. The full line B shows a differential thermal curve which has an endothermic peak due to probably the vaporization of the solvent and two exothermic peaks due to probably the decomposition of the indium compounds. The dotted line A shows a thermobalance curve which shows decreased amounts corresponding to the endothermic and exothermic peaks. The two curves show that the reaction is completed above about 400° C.

The thickness of the transparent conductive film is preferably 700 Å or less in the case of one-layer film construction. If the film is thicker than 700 Å, sheet resistance may be lowered but whitening phenomenon takes place, which results in lowering in the transmittance. In the case of the multilayered film construction, the thickness of the film may be thicker than 700 Å.

As the coating solution, a solution obtained by dissolving indium and tin in a mixed solution of acetylacetone and nitric acid so as to form an indium compound and a tin compound can also be used other than the one mentioned above. The indium compound and tin compound can preferably be used in the range of Sn/In (as weight ratio of each metal) 0.01/1 to 0.30/1. As an organic solvent for dissolving the indium and tin compounds, there may be used methanol, ethanol, acetone, or a mixture of two or more of them as a major component.

The thus produced transparent conductive film can give transparent electrodes having desired patterns by using conventional techniques such as etching, etc.

According to the process of this invention, since a proper amount of tin oxide is added to an indium oxide film, there can be obtained a transparent conductive film having excellent properties such as strong adhesive strength to a substrate, excellent transmittance and remarkably low sheet resistance. Further, since the transparent conductive film can be formed by the coating method, the conductive film can be produced with low cost, and thus the process of this invention is suitable for mass production of transparent conductive films.

What is claimed is:

1. A process for producing a transparent conductive film which comprises
   a coating step in which a solution obtained by dissolving an indium compound and a tin compound in an organic solvent is coated on a substrate,
   a preliminary drying step in which the coated substrate is dried at a temperature of 35° to 100° C.,
   a temperature rise step in which the coated substrate is heated at a temperature rise rate of about 100° C./min or more up to 400° C. or higher, and
   a calcination step in which the coated substrate is calcined at a temperature of 400° C. or higher.

2. A process according to claim 1, wherein the preliminary drying step, the temperature rise step and the calcination step are conducted continuously based on a temperature schedule.

3. A process according to claim 1, wherein the preliminary drying step is conducted at a temperature of 55° C.±10° C., and the temperature rise step is conducted by rapidly putting the coated substrate in a calcining furnace controlled at 400° C. or higher and raising the temperature of the coated substrate at said temperature rise rate about 100° C./min or more.

4. A process according to claim 1, wherein the coating step is conducted so that the transparent conductive film has a thickness of 700 Å or less.

5. A process according to claim 1, wherein the indium compound is one obtained by dissolving indium nitrate in acetylacetone or the reaction product or products thereof, and the tin compound is one obtained by dissolving tin in a mixed solution of acetylacetone and nitric acid or the reaction product or products thereof.

6. A process according to claim 1, wherein the solution used in the coating step is obtained by dissolving tin and indium in a mixed solution of acetylacetone and nitric acid.

7. A process according to claim 1, wherein the organic solvent is methanol, ethanol, or acetone or a mixture of two or more of them.

8. A process according to claim 1, wherein the weight ratio of tin to indium in the solution is 0.01/1 to 0.30/1.

9. A process according to claim 1, wherein the preliminary drying step is conducted at a temperature of between 45° C. to 70° C.

10. A process according to claim 1 or 2, wherein after the calcination step, the series of steps of coating, preliminary drying, temperature rise, and calcination is repeated at least once, whereby a multilayered film is formed.

11. A process according to claim 8, wherein each of the coating steps is conducted so that each layer of the multilayered film formed has a thickness of 700 Å or less.

12. A process according to claim 11, wherein a sufficient number of layers are formed such that the multilayered film has a total thickness greater than 700 Å.

* * * * *